(12) United States Patent
Okuyama

(10) Patent No.: US 10,145,692 B2
(45) Date of Patent: Dec. 4, 2018

(54) VEHICLE POSITION DETERMINATION APPARATUS AND VEHICLE POSITION DETERMINATION METHOD

(71) Applicant: Nissan Motor Co., Ltd., Yokohama-shi, Kanagawa (JP)

(72) Inventor: Takeshi Okuyama, Kanagawa (JP)

( * ) Notice: Subject to any disclaimer, the term of this patent is extended or adjusted under 35 U.S.C. 154(b) by 0 days.

(21) Appl. No.: 15/739,510

(22) PCT Filed: Jun. 26, 2015

(86) PCT No.: PCT/JP2015/068525
§ 371 (c)(1),
(2) Date: Dec. 22, 2017

(87) PCT Pub. No.: WO2016/208067
PCT Pub. Date: Dec. 29, 2016

(65) Prior Publication Data
US 2018/0209795 A1  Jul. 26, 2018

(51) Int. Cl.
*G01C 21/30* (2006.01)
*G06F 17/30* (2006.01)
(Continued)

(52) U.S. Cl.
CPC ....... *G01C 21/30* (2013.01); *G06F 17/30241* (2013.01); *G06K 9/00791* (2013.01); *G08G 1/0969* (2013.01)

(58) Field of Classification Search
CPC .............. G01C 21/30; G06F 17/30241; G06K 9/00791
(Continued)

(56) References Cited

U.S. PATENT DOCUMENTS 5,383,127 A * 1/1995 Shibata .................. G01C 21/30
340/988
7,840,326 B1 * 11/2010 Yamada ................. B60Q 1/085
701/472
(Continued)

FOREIGN PATENT DOCUMENTS

JP   H09243389 A   9/1997
JP   2005098853 A  4/2005
(Continued)

*Primary Examiner* — Marthe Y Marc-Coleman
(74) *Attorney, Agent, or Firm* — Young Basile Hanlon & MacFarlane, P.C.

(57) ABSTRACT

A vehicle position determination apparatus includes a storage device that stores map information containing positions of terrestrial objects located around roads, a vehicle position estimator that estimates a current position of a vehicle in the map information, a camera that captures an image of an area around the vehicle, an area identifier that identifies an area in which a terrestrial object to serve as a recognition target is located, the area Q being identified in the map information based on a predetermined condition, a terrestrial object recognizer that recognizes, in the image, the terrestrial object in the area Q, a relative position calculator that calculates, in the map information, a relative position of the vehicle P with respect to a position of the terrestrial object recognized, and a position corrector that corrects the current position of the vehicle based on the relative position calculated by the relative position calculator.

9 Claims, 7 Drawing Sheets

(51) Int. Cl.
*G06K 9/00* (2006.01)
*G08G 1/0969* (2006.01)

(58) Field of Classification Search
USPC ............ 701/448, 472, 469, 445, 26; 73/1.79
See application file for complete search history.

(56) References Cited

U.S. PATENT DOCUMENTS

| | | |
|---|---|---|
| 7,898,437 B2 | 3/2011 | Okada et al. |
| 8,442,791 B2 * | 5/2013 | Stahlin .................. G01C 21/30 340/995.25 |
| 8,566,029 B1 | 10/2013 | Lopatenko et al. |
| 2008/0243378 A1 | 10/2008 | Zavoli |
| 2010/0061591 A1 | 3/2010 | Okada et al. |
| 2010/0082238 A1 | 4/2010 | Nakamura et al. |
| 2012/0101722 A1 | 4/2012 | Inami et al. |

FOREIGN PATENT DOCUMENTS

| | | |
|---|---|---|
| JP | 2005265494 A | 9/2005 |
| JP | 2006331217 A | 12/2006 |
| JP | 2007309699 A | 11/2007 |
| JP | 2008083816 A | 4/2008 |
| JP | 2009139306 A | 6/2009 |
| JP | 2012252501 A | 12/2012 |
| JP | 2014066636 A | 4/2014 |
| KR | 20080037712 A | 4/2008 |
| WO | 2011048718 A1 | 4/2011 |

\* cited by examiner

VEHICLE POSITION DETERMINATION APPARATUS AND VEHICLE POSITION DETERMINATION METHOD

TECHNICAL FIELD

The present invention relates to a vehicle position determination apparatus and a vehicle position determination method for determining the position of a vehicle.

BACKGROUND

As a technique for correcting the current position of a vehicle detected by a position measurement device, proposed is a technique that corrects the position of a vehicle by finding the distance from the vehicle to an intersection using a camera mounted on the vehicle and then identifying the position of the vehicle relative to the intersection in map information (see Japanese Patent Application Publication No. Hei 9-243389).

The technique described in Japanese Patent Application Publication No. Hei 9-243389, however, may not be able to correct the current position of a vehicle in situations where it is difficult to detect an intersection, such as when the vehicle is travelling on an expressway.

SUMMARY

In view of this problem, the present invention aims to provide a vehicle position determination apparatus and a vehicle position determination method capable of correcting the current position of a vehicle accurately in various travel environments.

The vehicle position determination apparatus identifies an area in which a terrestrial object to serve as a recognition target is located, in map information based on a predetermined condition, recognizes in a captured image the terrestrial object in the identified area, calculates the relative position of a vehicle with respect to the position of the terrestrial object, and corrects the current position of the vehicle. The vehicle position determination apparatus identifies a first area as the area when a speed of the vehicle detected by the speed detector is below a predetermined threshold, the first area being an area from a first value to a second value larger than the first value in a distance from the vehicle, and identifies a second area as the area when the speed of the vehicle is above the threshold, the second area being an area from the first value to a third value larger than the second value in the distance from the vehicle.

DETAILED DESCRIPTION OF THE EMBODIMENTS

Figure 1:
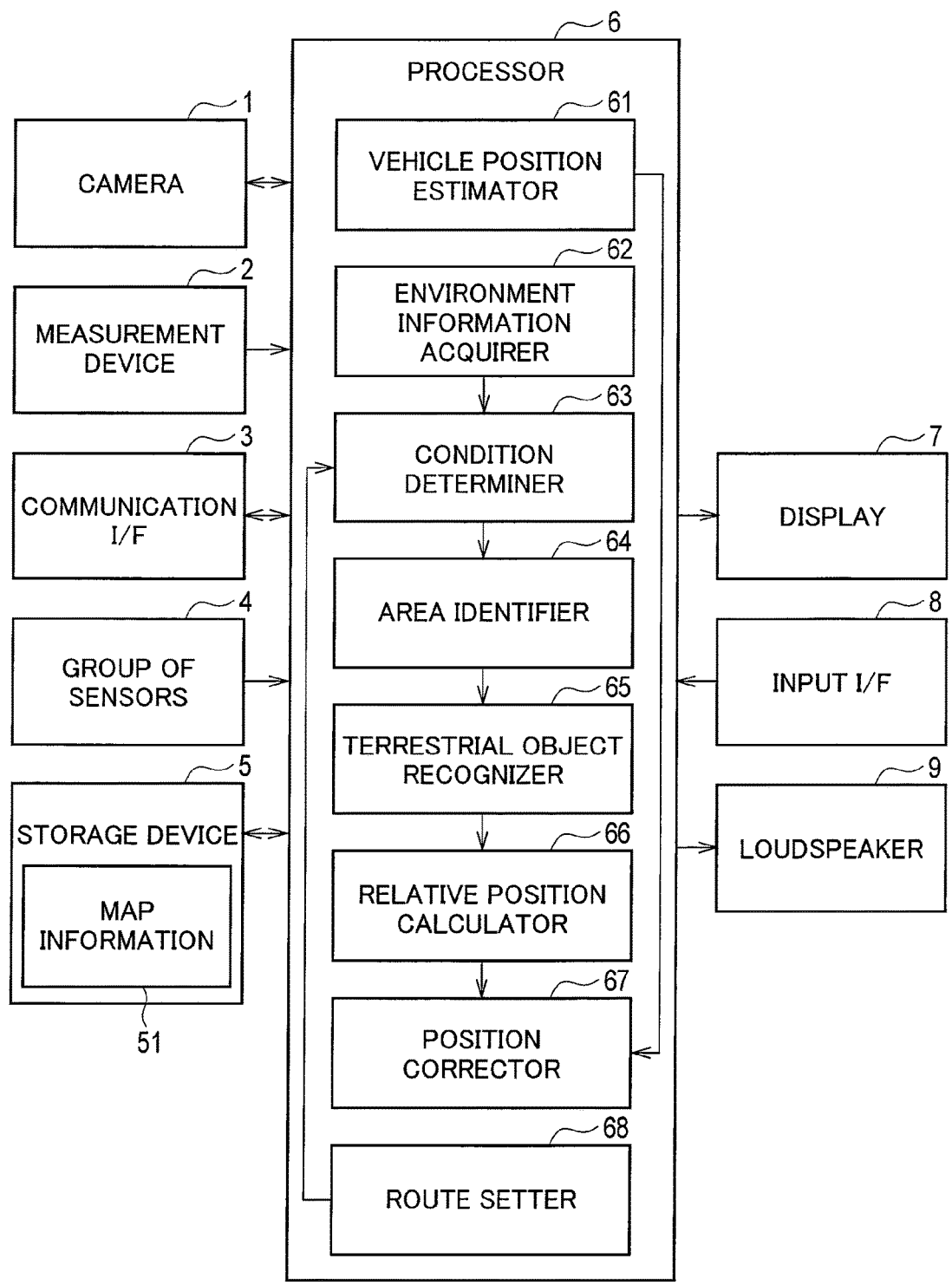
FIG. 1 is a block diagram illustrating an example configuration of a vehicle position determination apparatus according to an embodiment of the present invention.

An embodiment of the present embodiment is described with reference to the drawings. Throughout the drawings, the same or similar reference numerals denote the same or similar elements, and overlapping descriptions are omitted.

(Vehicle Position Determination Apparatus)

As shown in FIG. 1, a vehicle position determination apparatus according to the present embodiment includes a camera 1, a position measurement device 2, a communication interface (I/F) 3, a group of sensors 4, a storage device 5, a processor 6, a display 7, an input I/F 8, and a loudspeaker 9. The vehicle position determination apparatus according to the embodiment of the present invention is installed in a vehicle P (see FIGS. 2 to 9) and determines the current position of the vehicle P.

The camera 1 captures surrounding images of the vehicle P. Using for example a solid-state image pickup element such as a CCD or a CMOS, the camera 1 generates digital images that can be image-processed. The camera 1 outputs captured images to the processor 6 sequentially. The camera 1 may be a fixed camera that captures images of an area ahead of the vehicle P, or a 360-degree camera that captures 360-degree images around the vehicle P. Alternatively, the camera 1 may rotate in a direction of at least one of panning, tilting, and rolling and/or perform zooming in and out, as controlled by the processor 6.

The position measurement device 2 measures the current position using a position measurement system such as a global positioning system (GPS). The position measurement device 2 is formed by for example a GPS receiver. The position measurement device 2 outputs measured current positions to the processor 6 sequentially.

The communication I/F 3 is, for example, a communicator that transmits and receives signals to and from the outside wirelessly. The communication I/F 3 receives various kinds of information from the outside through, for example, an intelligent transport system (ITS), which transmits real-time information such as congestion information, traffic information such as traffic controls, and weather information. The ITS includes Vehicle Information and Communication System (VICS, registered trademark), telematics, and the like. The communication I/F 3 outputs received information to the processor 6 sequentially.

The group of sensors 4 may include a velocity sensor, an acceleration sensor, an angular velocity sensor, a steering angle sensor, and the like. The sensors in the group of sensors 4 detect the velocity of the vehicle P and the three-axis acceleration, angular velocity, and the like of the vehicle P in a three-dimensional Cartesian coordinate system, and output detection results to the processor 6 sequentially. The group of sensors 4 may include a distance sensor such as a laser range finder (LRF) that detects the distance from the vehicle P to a target and the direction of the vehicle P with respect to the target, an orientation sensor that detects the orientation of the vehicle P, and the like.

The storage device 5 stores map information 51 containing the positions and types of terrestrial objects located around the roads. The storage device 5 may be formed by semiconductor memory, a magnetic disk, or the like. In addition, the storage device 5 may store programs necessary for processing performed by the processor 6. The storage device 5 may be formed by one or more hardware elements.

The map information 51 has road information, facility information, and the like recorded therein. The map information 51 has terrestrial object information recorded therein, the terrestrial object information including the positions, sizes, types, and the like of various terrestrial objects located around the roads. Terrestrial objects around the roads include road signs such as ones notifying of a speed limit, a stop position, one-way traffic, a crosswalk, and parking prohibition, pavement markings such as ones indicative of a stop line, a crosswalk, a notice of an approach to a crosswalk, and a border line, and information signs such as ones providing information about a direction, service and parking areas (rest areas), a junction, and various facilities. In addition to these, terrestrial objects include distance signs, traffic lights, telegraph poles, tunnels, bridges, bridge supports, emergency parking bays, emergency phones, tollbooths, gantry cranes, road structures such as railroads, and facilities.

The processor 6 includes a vehicle position estimator 61, an environment information acquirer 62, a condition determiner 63, an area identifier 64, a terrestrial object recognizer 65, a relative position calculator 66, a position corrector 67, and a route setter 68. As a set route, the route setter 68 sets a travel route of the vehicle P in the map information 51, from the current position of the vehicle P to the destination.

The processor 6 may be formed by a microcontroller which is an integrated circuit including, for example, a central processing unit (CPU), a memory, an input/output I/F, and the like. In this case, the CPU executes computer programs installed beforehand in the microcontroller to implement the information processors (61 to 68) constituting the processor 6. The constituents of the processor 6 may be formed by a single hardware element or by separate hardware elements. The microcontroller may double an electronic control unit (ECU) used for controlling other aspects of the vehicle P, such as for example autonomous driving control.

The vehicle position estimator 61 estimates the current position of the vehicle P in the map information 51 based on the current position measured by the position measurement device 2 and the momentum of the vehicle P calculated using detection results from the group of sensors 4.

The environment information acquirer 62 acquires, from the communication I/F 3, traffic information, weather information, and the like concerning the region where the vehicle P is currently travelling.

The condition determiner 63 determines a travel condition of the vehicle P based on at least one of an image captured by the camera 1, detection results from the group of sensors 4, the current position of the vehicle P estimated by the vehicle position estimator 61, information acquired by the environment information acquirer 62, and a travel route set by the route setter 68. The travel condition determined by the condition determiner 63 includes at least one of a surrounding environment such as the weather, a time slot, a road surface condition, and a travel location, a travel state such as a travel status and a travel lane, and a travel route of the vehicle P.

The condition determiner 63 determines the weather, such as if it is, for example, sunny, rainy, snowy, or foggy, based on the weather information and the like acquired from the environment information acquirer 62. The condition determiner 63 may determine the weather based on other factors such as a detection result from a raindrop sensor that the group of sensors 4 may have or if and how the windshield wiper of the vehicle P is driven. The condition determiner 63 determines the time slot, i.e., whether it is daytime or nighttime, based on the current time relative to the sunup time and the sundown time, a detection result from an illuminance sensor that the group of sensors 4 may have, or the like.

Based on the weather information acquired from the environment information acquirer 62, an image captured by the camera 1, or the like, the condition determiner 63 determines the road-surface condition of the road on which the vehicle P is travelling, such as being wet, snow-covered, icy, or a poorly-conditioned road which is properly paved but unexposed. The condition determiner 63 may determine the road surface condition based on a detection result from a slip sensor that the group of sensors 4 may have, the slip sensor detecting a slip of a wheel on the vehicle P. The condition determiner 63 also determines the travel location of the vehicle P, such as an urban area, a suburban area, an expressway, a general road, or a mountain road, based on the current position estimated by the vehicle position estimator 61.

The condition determiner 63 determines a travel status, such as travelling on an expressway (or a limited highway) and traffic congestion, based on the traffic information acquired from the environment information acquirer 62. The condition determiner 63 may determine a travel status, such as whether the vehicle P is travelling at high speeds or at low speeds, based on a detection result from the velocity sensor that the group of sensors 4 has. Alternatively, the condition determiner 63 may determine that traffic congestion is occurring when the distances from the vehicle P to the vehicle in front and the vehicle behind calculated based on images captured by the camera 1 remain short for a predetermined period of time.

The condition determiner 63 determines a travel lane, such as a right lane, a left lane, or a center lane between the right and left lanes, based on the images captured by the camera 1, the current position estimated by the vehicle position estimator 61, the momentum of the vehicle P calculated using detection results from the group of sensors 4, or the like.

The condition determiner 63 also makes a determination as to a travel route of the vehicle P, such as whether a travel route has been set by the route setter 68. If there is a set route set by the route setter 68, the condition determiner 63 determines based on the set route whether the set route bends at an angle of a predetermined threshold or above. If there is no set route, the condition determiner 63 determines based on the direction indicated by a turn signal or on the travel lane of the vehicle P whether the vehicle is going to make a turn at an intersection.

Based on the travel condition(s) determined by the condition determiner 63, the area identifier 64 identifies, in the map information 51, an area Q (see FIGS. 2 to 9) as a range within which a terrestrial object to serve as a recognition target is located. For example, the area identifier 64 identifies the area Q around the road ahead of the vehicle P in its travel direction.

The terrestrial object recognizer 65 recognizes, in an image captured by the camera 1, a terrestrial object located in the area Q identified by the area identifier 64. The terrestrial object recognizer 65 recognizes a terrestrial object corresponding to a terrestrial object in the area Q in the map information 51 by performing predetermined image processing on the image captured by the camera 1, such as edge detection or pattern matching that calculates similarities to a template stored beforehand. The terrestrial object recognizer 65 associates the recognized terrestrial object with a terrestrial object located in the area Q in the map information 51 identified by the area identifier 64. The terrestrial object recognizer 65 also calculates, based on the image captured by the camera 1, the direction of the recognized terrestrial object to the vehicle P and the distance from the vehicle P to the terrestrial object. The terrestrial object recognizer 65 may acquire the distance and direction to the recognized terrestrial object using, for example, the LRF that the group of sensors 4 may have.

Figure 2:
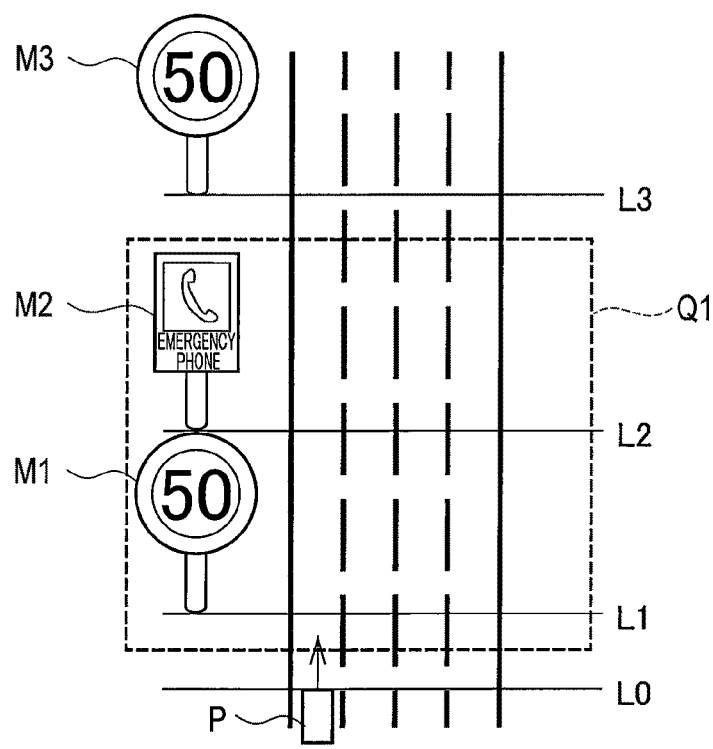
FIG. 2 is a diagram illustrating an area identified by an area identifier of the vehicle position determination apparatus according to the embodiment of the present invention.

For example, when the travel state determined by the condition determiner 63 indicates low-speed travelling, meaning traveling at speeds lower than a predetermined threshold, the area identifier 64 identifies an area Q1 as shown in FIG. 2 in an area around the road ahead of the vehicle P in its travel direction. In the example shown in FIG. 2, the area Q1 is an area from L1 to L2, each indicating the distance from the position L0 of the vehicle P. For example, during low-speed traveling, the terrestrial object recognizer 65, which can recognize a terrestrial object distanced from the vehicle P by L3 or greater, the area identifier 64 can set the upper limit of the distance from the vehicle P for the area Q1 to L2, which is relatively short (L1<L2<L3), because there is enough time to recognize the terrestrial object. Assuming that there are a road sign M1, an emergency phone M2, and a road sign M3 at the positions L1 to L3, respectively, the road sign M3 is excluded from the area Q1 at the moment shown in FIG. 2. Since the area Q1 is thus identified efficiently with less recognition targets, less processing load is put on the terrestrial object recognizer 65.

Figure 3:
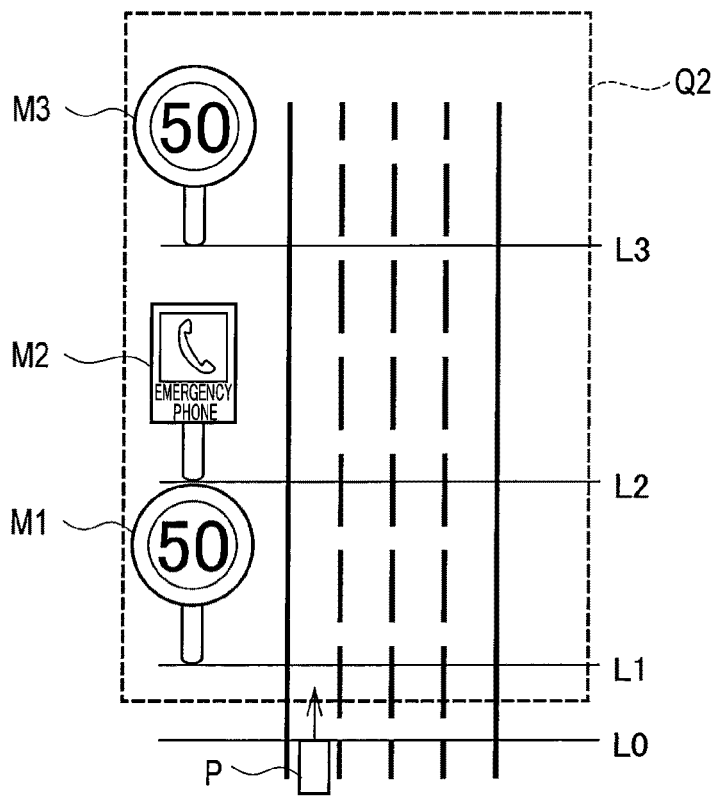
FIG. 3 is a diagram illustrating an area identified by the area identifier of the vehicle position determination apparatus according to the embodiment of the present invention.

When, on the other hand, the travel state determined by the condition determiner 63 indicates high-speed traveling, meaning traveling at speeds higher than the predetermined threshold, the area identifier 64 identifies an area Q2 as shown in FIG. 3 in an area around the road ahead of the vehicle P in its travel direction, the area Q2 covering a deeper distance than the area Q1. In the example shown in FIG. 3, the area Q2 is an area from positions L1 to L3, each indicating the distance from the vehicle P. During high-speed traveling, the area identifier 64 sets the upper limit of the distance from the vehicle P for the area Q2 to L3, which is farther away than L2, because there is relatively short time for the terrestrial object recognizer 65 to recognize a terrestrial object. Since the road sign M3 is thus included in the area Q2 in the moment shown in FIG. 3, the terrestrial object recognizer 65 is given more time to recognize a recognition target and therefore can recognize the recognition target with higher accuracy.

When the surrounding environment determined by the condition determiner 63 indicates that it is nighttime, the area identifier 64 identifies the area Q1 as shown in FIG. 2, which is shorter than the area Q2 in the extending direction of the road, because the terrestrial object recognizer 65 recognizes a faraway object less accurately during nighttime than daytime. When, on the other hand, the surrounding environment determined by the condition determiner 63 indicates that it is daytime, the area identifier 64 identifies the area Q2 as shown in FIG. 3, which is longer than the area Q1 in the extending direction of the road, because the terrestrial object recognizer 65 is able to recognize a faraway object more accurately during daytime than nighttime. Note that L1 in FIGS. 2 and 3 indicates the shortest distance to a terrestrial object recognizable by the terrestrial object recognizer 65. L1 may be set based on the viewing angle of the camera 1, the type of a terrestrial object to serve as a recognition target, or the like.

Figure 4:
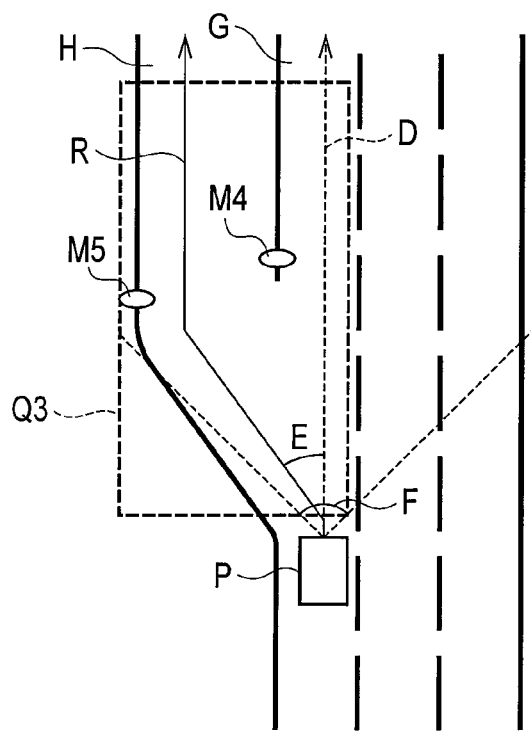
FIG. 4 is a diagram illustrating an area identified by the area identifier of the vehicle position determination apparatus according to the embodiment of the present invention.

If the condition determiner 63 determines that the travel route R of the vehicle P bends with respect to the straight direction D at an angle E below a predetermined threshold, the area identifier 64 identifies an area Q3 as shown in FIG. 4 in an area around the road ahead of the bending point of the travel route R. If there is a set route set by the route setter 68, the condition determiner 63 makes the determination about the angle E once the distance from the vehicle P to the bending point of the set route falls to or below a predetermined threshold. If there is no set route, the condition determiner 63 determines, based on the direction indicated by a turn signal, the travel lane of the vehicle P, or the like, that the turning angle of the vehicle P in the map information 51 is the angle E at which the travel route R bends.

For example, when the vehicle P enters a side lane H from a main lane G, the area Q3 as shown in FIG. 4 includes a terrestrial object M4 around the main lane G and a terrestrial object M5 around the side lane H, both objects being located near the diverging point. In this respect, the terrestrial object M4 and the terrestrial object M5 are both located within the viewing angle F of the camera 1 and are thus recognizable by the terrestrial object recognizer 65. In this way, the area identifier 64 efficiently identifies the area Q based on the travel route R so that the area Q may include terrestrial objects expected to be recognizable, and thereby enables improvement in the recognition accuracy.

Figure 5:
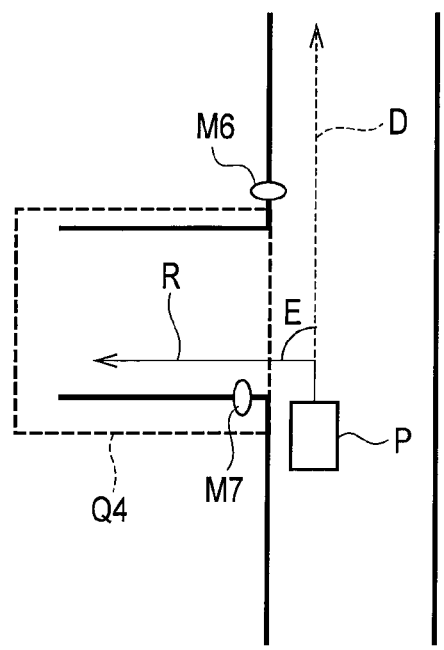
FIG. 5 is a diagram illustrating an area identified by the area identifier of the vehicle position determination apparatus according to the embodiment of the present invention.

If the condition determiner 63 determines that the travel route R of the vehicle P bends with respect to the straight direction D at an angle E equal to or above the predetermined threshold, the area identifier 64 identifies an area Q4 as shown in FIG. 5 in an area around the road ahead of the bending point of the travel route R, excluding areas around the roads off the travel route R. Alternatively, if the condition determiner 63 determines that the vehicle P is going to make a turn at an intersection, the area identifier 64 identifies the area Q4, excluding areas around the roads which intersect at the intersection and are off the travel route R. In the example shown in FIG. 5 where, near an intersection, a terrestrial object M6 is located around the road ahead in the straight-through direction and a terrestrial object M7 is located around the travel route R, the terrestrial object M6 near the road which is ahead of the intersection and off the travel route R is excluded from the area Q4. Since the area Q4 is thus identified efficiently with less recognition targets, less processing load is put on the terrestrial object recognizer 65.

Figure 6:
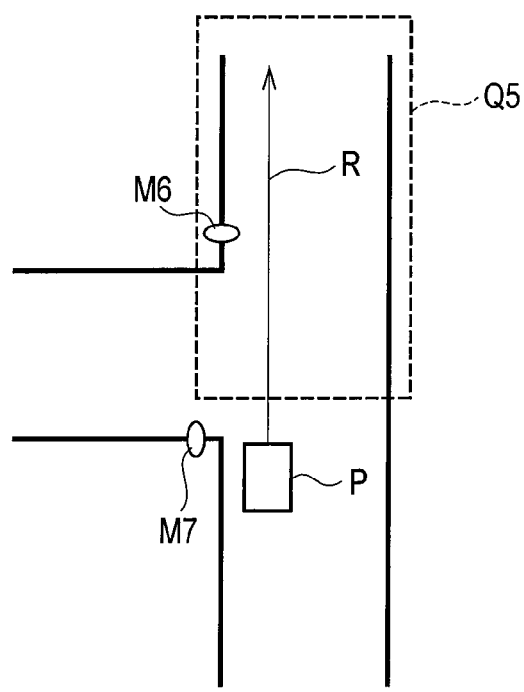
FIG. 6 is a diagram illustrating an area identified by the area identifier of the vehicle position determination apparatus according to the embodiment of the present invention.

Also in a situation where the vehicle P does not make a turn but travels straight through an intersection as shown in FIG. 6, the area identifier 64 identifies the area Q5, excluding areas around the roads which intersect at the intersection and are off the travel route R. The area identifier 64 can put less processing load on the terrestrial object recognizer 65 by excluding from the area Q5 the terrestrial object M7, which is less likely to be recognized due to the installation direction of the terrestrial object M7, an obstacle, or the like.

Figure 7:
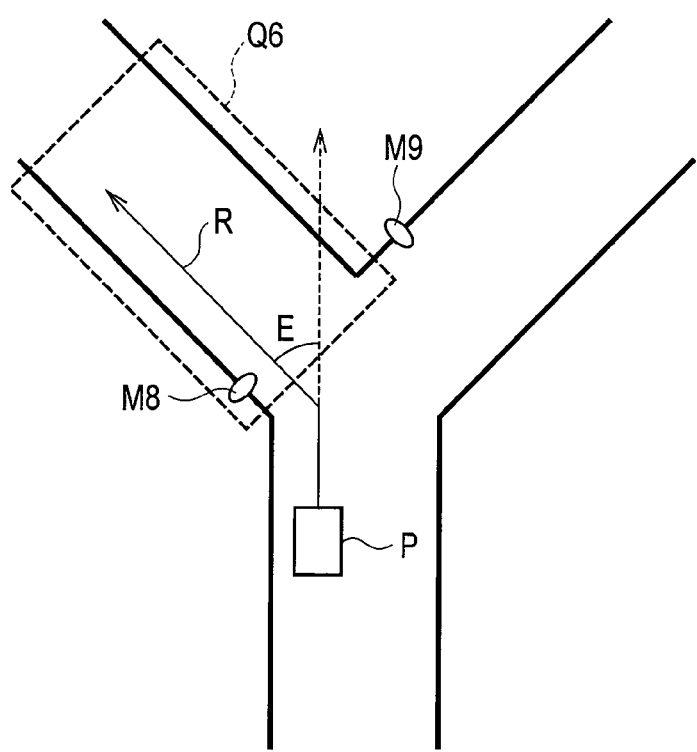
FIG. 7 is a diagram illustrating an area identified by the area identifier of the vehicle position determination apparatus according to the embodiment of the present invention.

Although the intersection illustrated as an example in FIGS. 5 and 6 is a T-shaped intersection, the intersection may be a four-way intersection or an intersection of three or more roads intersecting not orthogonally. For example, as shown in FIG. 7, if the vehicle P makes a turn at a Y-shaped intersection at an angle E below the predetermined threshold, the area identifier 64 identifies an area Q6 in an area around the road on the travel route R, excluding an area around the road off the travel route R. If there are a terrestrial object M8 and a terrestrial object M9 near the Y-shaped intersection with the terrestrial object M8 being located around the road on the travel route R and the terrestrial object M9 being located around the road off the travel route R, the terrestrial object M9 is excluded from the area Q6. If the terrestrial object M9 is expected to be recognizable from the travel route R due to the installation orientation, size, or the like of the terrestrial object M9, the area identifier 64 may identify the area Q6 such that it includes the terrestrial object M9.

Figure 8:
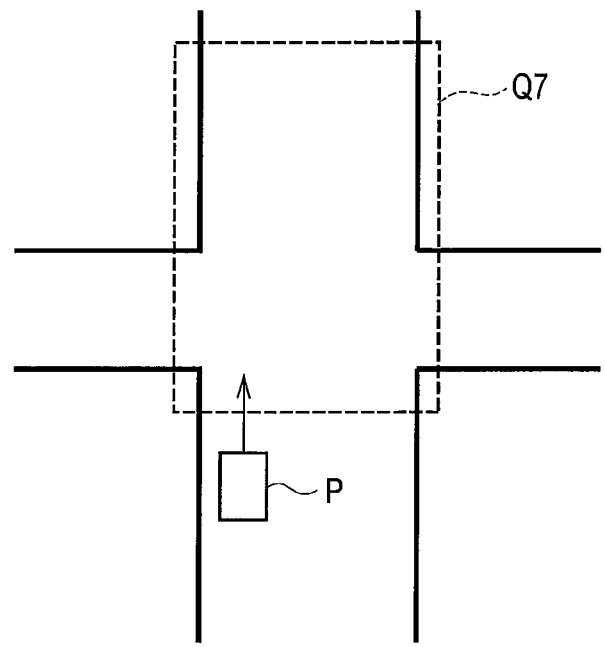
FIG. 8 is a diagram illustrating an area identified by the area identifier of the vehicle position determination apparatus according to the embodiment of the present invention.

In a situation as shown in FIG. 8 where there is a four-way intersection ahead of the vehicle P in its travel direction, and the road on which the vehicle P is travelling is larger in scale than the other road intersecting at the intersection, the area identifier 64 identifies an area Q7 in an area around the road ahead of the intersection in the travel direction. The scale of a road may be set based on the width of the road or the volume of traffic on the road. In the above case, it is likely that the vehicle P will travel straight through the intersection. Thus, by identifying the area Q7 in the area around the road ahead of the intersection in the travel direction, the area identifier 64 enables the terrestrial object recognizer 65 to recognize a terrestrial object efficiently with higher recognition accuracy.

Figure 9:
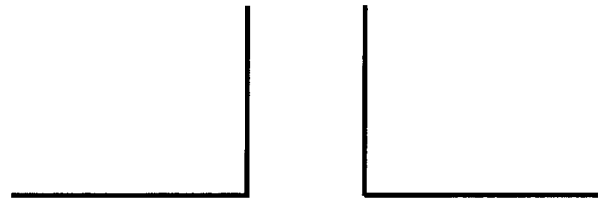
FIG. 9 is a diagram illustrating an area identified by the area identifier of the vehicle position determination apparatus according to the embodiment of the present invention.
Figure 9:
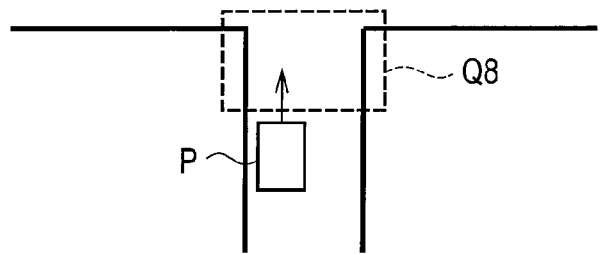

In a situation as shown in FIG. 9 where there is a four-way intersection ahead of the vehicle P in the travel direction, and the road on which the vehicle P is travelling is smaller in scale than the other road intersecting at the intersection, the area identifier 64 identifies an area Q8, excluding an area around the road ahead of the intersection in the travel direction. In this case, since it is likely in the above case that the vehicle P will make a turn at the intersection, the area identifier 64 identifies the area Q8 excluding an area around the road ahead of the intersection in the travel direction, so that the number of recognition targets can be reduced efficiently to put less processing load on the terrestrial object recognizer 65.

The relative position calculator 66 calculates the relative position of the vehicle P with respect to the position of the terrestrial object recognized by the terrestrial object recognizer 65. The relative position calculator 66 identifies the position, in the map information 51, of the terrestrial object recognized by the terrestrial object recognizer 65 based on the position of the terrestrial object in the map information 51 associated with the terrestrial object recognized by the terrestrial object recognizer 65. The relative position calculator 66 further calculates the relative position of the vehicle P in the map information 51 based on the direction and distance to the terrestrial object calculated by the terrestrial object recognizer 65.

The position corrector 67 corrects the current position of the vehicle P estimated by the vehicle position estimator 61, based on the relative position of the vehicle P calculated by the relative position calculator 66. In other words, the position corrector 67 determines the current position of the vehicle P by correcting the current position of the vehicle P estimated by the vehicle position estimator 61 to the relative position of the vehicle P calculated by the relative position calculator 66.

The display 7 presents various kinds of information to an occupant of the vehicle P by displaying images and/or text as controlled by the processor 6. For example, the display 7 is formed by a display device such as a liquid crystal display. As controlled by the processor 6, the display 7 can display a map including roads and facilities recorded in the map information 51, and display the current position of the vehicle P corrected by the position corrector 67 over the map being displayed.

For example, the input I/F 8 receives an operational input from an occupant and outputs a signal to the processor 6 in accordance with the operational input. The display 7 and the input I/F 8 may be configured together as a touch panel display. The loudspeaker 9 presents, as controlled by the processor 6, various kinds of information to an occupant of the vehicle P by outputting audio.

(Vehicle Position Determination Method)

Figure 10:
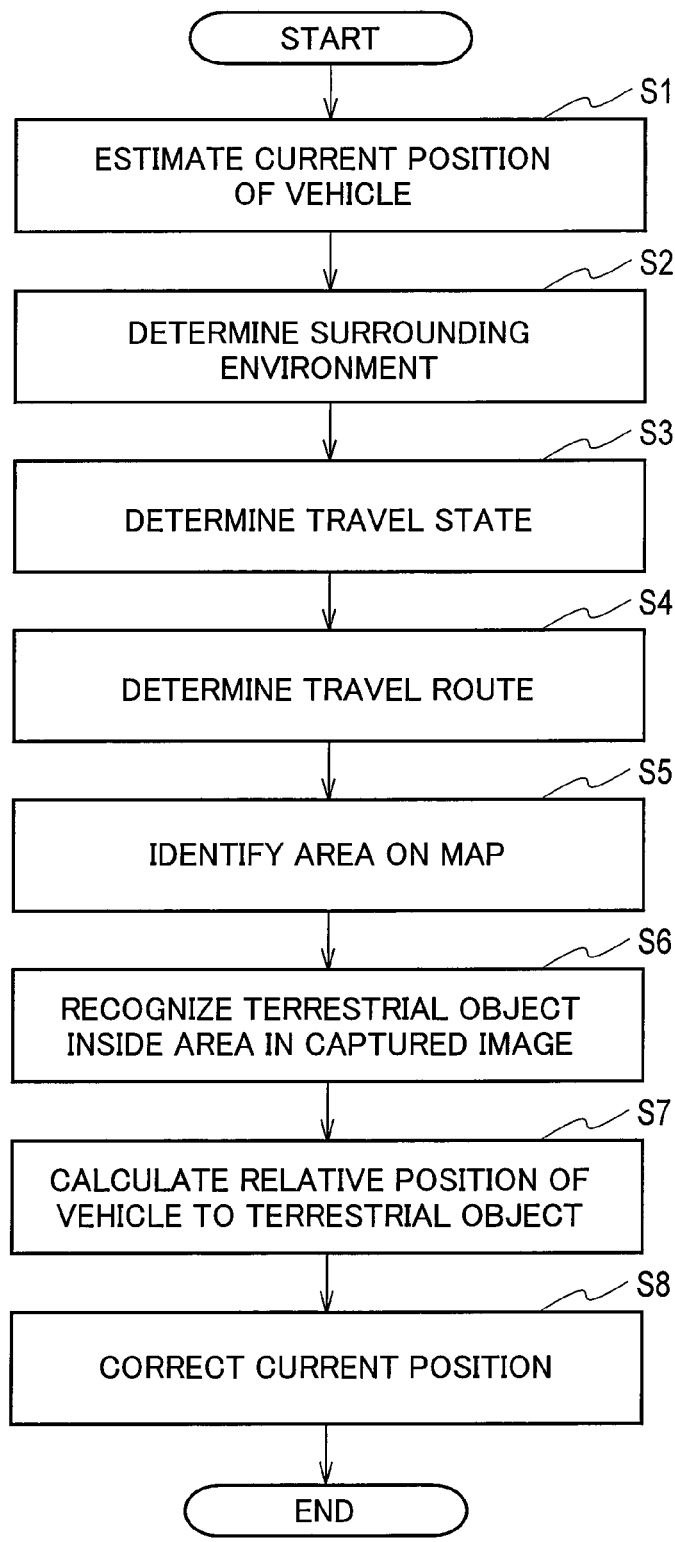
FIG. 10 is a flowchart of processing performed by the vehicle position determination apparatus according to the embodiment of the present invention.

With reference to a flowchart in FIG. 10, an example is described of how the vehicle position determination apparatus according to the present embodiment operates.

In Step S1, the vehicle position estimator 61 estimates the current position of the vehicle P in the map information 51 by correcting the current position measured by the position measurement device 2, based on the momentum of the vehicle P calculated using detection results from the group of sensors 4.

In Step S2, the condition determiner 63 determines a surrounding environment which includes at least one of the weather, the time slot, the road surface condition, and the travel location. In Step S3, the condition determiner 63 determines a travel state including at least one of a travel status and a travel lane. In Step S4, the condition determiner 63 determines the travel route R of the vehicle P.

In Step S5, based on the travel conditions determined in Steps S2 to S4, the area identifier 64 identifies an area Q in the map information 51 as a range within which a recognition target is situated. For example, if it is determined that the road surface condition is wet, snow-covered, or poor, the area identifier 64 may identify the area Q on the side of the road because a terrestrial object on the road surface, such as a road sign painted on the road surface, is difficult to recognize. The area identifier 64 may identify the area Q on the right side of the road if the travel lane is a right lane, because a terrestrial object on the right side is more easily recognizable, and may identify the area Q on the left side of the road if the travel lane is a left lane, because a terrestrial object on the left side is more easily recognizable. The area identifier 64 may identify the area Q on the road if the travel lane is a center lane, because a terrestrial object above or on the left side of the road, which is the side where vehicles drive, is more easily recognizable.

The area identifier 64 may identify the area Q based comprehensively on the travel conditions determined in Steps S2 to S4. For example, if it is determined that the surrounding environment is an urban area, the travel state is traveling at low speeds, a travel route is set, and the distance to the intersection at which the vehicle P is going to make a turn is equal to or below a threshold, the area identifier 64 identifies the area Q in an area around the road ahead of the turning position, the area Q being relatively short in the extending direction of the road. For example, if it is determined that the surrounding environment is nighttime and the travel state is traveling at high speeds, the area identifier 64 may determine the upper limit of the distance of the area Q according to the accuracy of recognizing terrestrial objects.

In Step S6, the terrestrial object recognizer 65 recognizes a terrestrial object located in the area Q identified by the area identifier 64, in an image captured by the camera 1. Based on the image captured by the camera 1, the terrestrial object recognizer 65 also calculates the direction of the recognized terrestrial object with respect to the vehicle P and the distance from the vehicle P to the recognized terrestrial object.

In Step S7, the relative position calculator 66 calculates the relative position of the vehicle P with respect to the position, in the map information 51, of the terrestrial object recognized by the terrestrial object recognizer 65. In Step S8, based on the relative position of the vehicle P calculated by the relative position calculator 66, the position corrector 67 corrects the current position of the vehicle P estimated by the vehicle position estimator 61.

(Identification of the Area Q based on the Travel Route)

Figure 11:
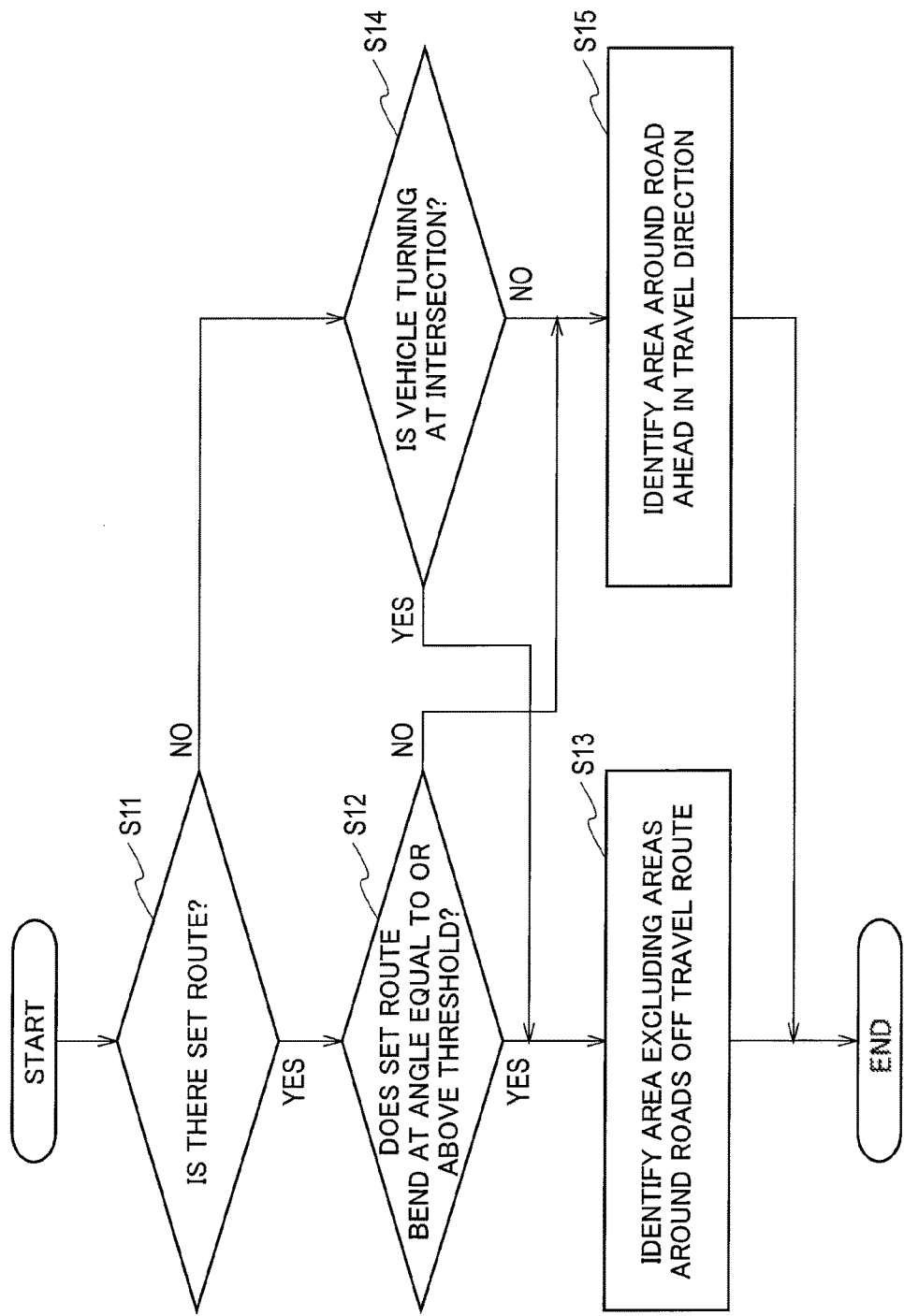
FIG. 11 is a flowchart of processing performed by a condition determiner and the area identifier of the vehicle position determination apparatus according to the embodiment of the present invention, the processing being related to a travel route.

With reference to a flowchart in FIG. 11, an example of how the condition determiner 63 and the area identifier 64 operate is described as a method for identifying the area Q based on a determination as to a travel route, which is one of the travel conditions. The flowchart in FIG. 11 corresponds to Steps S4 and S5 of the flowchart in FIG. 10.

In Step S11, the condition determiner 63 determines whether there is a set route set by the route setter 68. The condition determiner 63 causes the processing to proceed to Step S12 if there is a set route, or to Step S14 if there is no set route.

In Step S12, once the distance from the vehicle P to a bending point in the set route falls to or below a predetermined threshold, the condition determiner 63 determines whether the angle E at which the set route bends is equal to or above a predetermined threshold. The condition determiner 63 causes the processing to proceed to Step S13 if the angle E is equal to or above the threshold, or to Step S15 if the angle E is below the threshold.

In Step S14, once the distance from the vehicle P to an intersection falls to or below a predetermined threshold, the condition determiner 63 determines based on the direction indicated by a turn signal or the travel lane of the vehicle P whether the vehicle P is going to make a turn at the intersection. The condition determiner 63 causes the processing to proceed to Step S13 if determining that the vehicle P is going to make a turn, or to Step S15 if determining that the vehicle P is not going to make a turn.

In Step S13, the area identifier 64 identifies the area Q in an area around the road on the travel route ahead in the travel direction, excluding an area around the road off the travel route. Then, the area identifier 64 causes the processing to proceed to Step S6 of the flowchart in FIG. 10.

In Step S15, the area identifier 64 identifies the area Q in an area around the road on the travel route ahead in the travel direction. Then, the area identifier 64 causes the processing to proceed to Step S6 of the flowchart of FIG. 10.

As described above, the vehicle position determination apparatus according to the present embodiment corrects the current position of the vehicle P by identifying an area Q in the map information 51 based on the travel conditions of the vehicle P and recognizing various terrestrial objects located in the area Q. The vehicle position determination apparatus according to the present embodiment thus can correct the current position more frequently and maintain high accuracy of the current position of the vehicle P in various travel environments. By identifying the area Q, the vehicle position determination apparatus according to the present embodiment can efficiently limit the number of terrestrial objects to serve as recognition targets and therefore lessen the load of the recognition processing.

By identifying the area Q suitable for the surrounding environment of the vehicle P, such as the weather, the time slot, the road surface condition, and/or the travel location, the vehicle position determination apparatus according to the present embodiment can efficiently recognize terrestrial objects located around the road, and therefore can correct the current position of the vehicle P accurately. In accordance with the surrounding environment, the vehicle position determination apparatus according to the present embodiment can efficiently identify the area Q that includes a terrestrial object expected to be recognizable, thereby lessening the load of the recognition processing.

By identifying the area Q suitable for the travel state of the vehicle P, such as a travel status and/or a travel lane, the vehicle position determination apparatus according to the present embodiment can identify terrestrial objects around the road efficiently and therefore correct the current position of the vehicle P accurately. In accordance with the travel state, the vehicle position determination apparatus according to the present embodiment can efficiently identify the area Q which includes a terrestrial object expected to be recognizable, thereby lessening the load of the recognition processing.

Further, in accordance with a set route, the vehicle position determination apparatus according to the present embodiment can efficiently identify the area Q which includes a terrestrial object expected to be recognizable and correct the current position of the vehicle accurately, thereby lessening the load of the recognition processing.

The vehicle position determination apparatus according to the present embodiment identifies the area Q in an area around the road ahead in the travel direction when the set route indicates that the vehicle P will turn at an angle E below a predetermined threshold. The vehicle position determination apparatus according to the present embodiment can thus efficiently identify the area Q which includes a terrestrial object expected to be recognizable from the vehicle P, and therefore can correct the current position of the vehicle accurately.

Moreover, if the vehicle P is going to make a turn at an intersection, the vehicle position determination apparatus according to the present embodiment identifies the area Q which excludes areas around the roads off the travel route, thereby lessening the load of the recognition processing.

According to the scale of the road on which the vehicle P is traveling and that of the intersecting road, the vehicle position determination apparatus according to the present embodiment identifies the area Q in an area around the road that the vehicle P is likely to travel on. Thus, the vehicle position determination apparatus according to the present embodiment can correct the current position of the vehicle accurately and lessen the load of the recognition processing.

(Other Embodiments)

As described above, the details of the present invention have been disclosed using the embodiment of the present invention. However, it should not be understood that the description and drawings which constitute part of this disclosure limit the present invention. From this disclosure, various alternative embodiments, examples, and operation techniques will be easily found by those skilled in the art.

For example, in the embodiment described above, when the sun is located in the image capturing direction, i.e., the camera 1 has an image capturing condition of backlight, the area identifier 64 may identify the area Q excluding a backlighted area because the accuracy for recognizing terrestrial objects in such a backlight area is low.

In the embodiment described above, the camera 1 may change the image capturing direction or zoom power as controlled by the processor 6 to capture an image of a terrestrial object in the identified area Q. If, for example, the size of a terrestrial object to serve as a recognition target is larger than a predetermined threshold, the area identifier 64 may identify a single area Q for the single terrestrial object.

It goes without saying that the present invention includes various other embodiments and the like which are not described herein, such as a configuration in which the configurations described above are applied to one another. Accordingly, the technical scope of the present invention should be determined only by the matters to define the invention in the scope of claims regarded as appropriate based on the description.

The present invention can provide a vehicle position determination apparatus and a vehicle position determination method capable of correcting the current position of a vehicle accurately in various travel environments by identifying an area including a terrestrial object to serve as a recognition target, in accordance with predetermined conditions.

REFERENCE SIGNS LIST

P vehicle
Q, Q1 to Q8 area
R travel route
1 camera
5 storage device
51 map information
61 vehicle position estimator
64 area identifier
65 terrestrial object recognizer
66 relative position calculator
67 position corrector
68 route setter

The invention claimed is:

1. A vehicle position determination apparatus comprising:
    a storage device that stores map information containing positions of terrestrial objects located around roads;
    a vehicle position estimator that estimates a current position of a vehicle in the map information;
    a camera that captures an image of an area around the vehicle;
    an area identifier that identifies an area in which a terrestrial object to serve as a recognition target is located, in the map information based on a predetermined condition;
    a terrestrial object recognizer that recognizes, in the image, the terrestrial object in the area identified by the area identifier;
    a relative position calculator that calculates, in the map information, a relative position of the vehicle with respect to a position of the terrestrial object recognized by the terrestrial object recognizer;
    a position corrector that corrects the current position of the vehicle based on the relative position calculated by the relative position calculator; and
    a speed detector that detects a speed of the vehicle, wherein
    the area identifier identifies a first area as the area when the speed of the vehicle is below a predetermined threshold, the first area being an area from a first value to a second value larger than the first value in a distance from the vehicle, and identifies a second area as the area when the speed of the vehicle is above the threshold, the second area being an area from the first value to a third value larger than the second value in the distance from the vehicle.

2. The vehicle position determination apparatus according to claim 1, wherein the area identifier identifies the area based on a surrounding environment of the vehicle, which is at least one of weather, a time slot, a road surface condition, and a travel location.

3. The vehicle position determination apparatus according to claim 1, wherein the area identifier identifies the area based on a travel lane of the vehicle.

4. The vehicle position determination apparatus according to claim 1, further comprising a route setter that sets a travel route of the vehicle in the map information, wherein the area identifier identifies the area based on the travel route set by the route setter.

5. The vehicle position determination apparatus according to claim 4, wherein
    when the travel route bends at an angle below a predetermined threshold, the area identifier identifies, as the area, an area around the travel route ahead in a travel direction of the vehicle.

6. The vehicle position determination apparatus according to claim 1, wherein
    when the vehicle is going to travel straight through an intersection, the area identifier identifies the area by excluding an area around a road off a travel route of the vehicle out of roads intersecting at the intersection.

7. The vehicle position determination apparatus according to claim 1, wherein
    if there is an intersection ahead in a travel direction of the vehicle and a first road on which the vehicle is travelling is smaller in scale than a second road which intersects with the first road at the intersection, the area identifier identifies the area by excluding an area around a road ahead of the intersection in the travel direction.

8. A vehicle position determination method comprising:
    capturing an image of an area around a vehicle with a camera;
    detecting a speed of the vehicle by a speed sensor;
    estimating, with a processor, a current position of the vehicle in map information containing positions of terrestrial objects located around roads;
    identifying, with the processor, an area in which a terrestrial object to serve as a recognition target is located, in the map information based on a predetermined condition;
    recognizing, with the processor, in the image captured by the camera, the terrestrial object in the area identified;
    calculating, with the processor, in the map information, a relative position of the vehicle with respect to a position of the terrestrial object recognized;
    correcting, with the processor, the current position of the vehicle based on the relative position calculated; and
    identifying, with the processor, a first area as the area when the speed of the vehicle detected by the speed sensor is below a predetermined threshold, the first area being an area from a first value to a second value larger than the first value in a distance from the vehicle, and identifying a second area as the area when the speed of the vehicle detected by the speed sensor is above the threshold, the second area being an area from the first value to a third value larger than the second value in the distance from the vehicle.

9. A vehicle position determination apparatus comprising:
a storage device that stores map information containing positions of terrestrial objects located around roads;
a camera that captures an image of an area around a vehicle;
a speed sensor that detects a speed of the vehicle;
a processor; and
a memory for storing instructions executable by the processor, wherein the instructions, when executed by the processor, cause the processor to:
estimate a current position of the vehicle in the map information;
identify an area in which a terrestrial object to serve as a recognition target is located, in the map information based on a predetermined condition, wherein a first area is identified as the area when the speed of the vehicle detected by the speed sensor is below a predetermined threshold, the first area being an area from a first value to a second value larger than the first value in a distance from the vehicle, and a second area is identified as the area when the speed of the vehicle detected by the speed sensor is above the threshold, the second area being an area from the first value to a third value larger than the second value in the distance from the vehicle;
recognize, in the image, the terrestrial object in the identified area;
calculate, in the map information, a relative position of the vehicle with respect to a position of the recognized terrestrial object; and
correct the current position of the vehicle based on the calculated relative position.

* * * * *